UNITED STATES PATENT OFFICE.

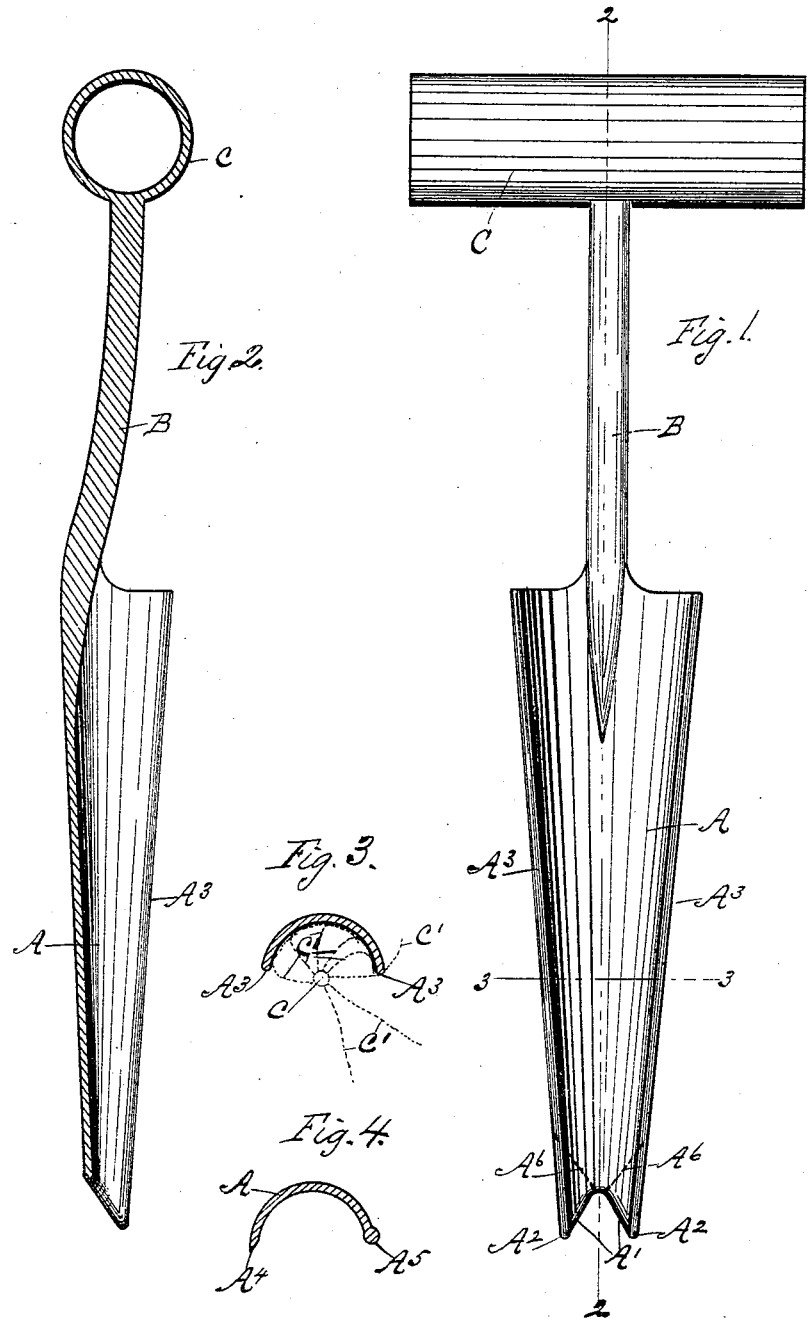

ROBERT F. SILLIMAN, OF TROY, NEW YORK.

LAWN-WEEDER.

SPECIFICATION forming part of Letters Patent No. 457,871, dated August 18, 1891.

Application filed October 8, 1890. Serial No. 367,429. (No model.)

*To all whom it may concern:*

Be it known that I, ROBERT F. SILLIMAN, a citizen of the United States, residing at Troy, county of Rensselaer, and State of New York, have invented certain new and useful Improvements in Lawn-Weeders, of which the following is a specification.

My invention relates to such improvements; and it consists of the novel construction and combination of parts hereinafter described, and subsequently claimed.

Reference may be had to the accompanying drawings, and to the letters of reference marked thereon, which form a part of this specification.

Similar letters refer to similar parts in the several figures therein.

Figure 1 of the drawings is a front elevation of my improved lawn-weeder. Fig. 2 is a central vertical section taken on the broken line 2 2 in Fig. 1. Fig. 3 is a cross-section of the blade, taken on the broken line 3 3 in Fig. 1. Fig. 4 is a cross-section showing a modification.

My improved weeder is composed of a blade A, shank B, and handle C. The blade is concavo-convex and tapers gradually from the shank to a point near the lower end, which is provided with beveled edges A', forming the points $A^2$, adapted to enter the ground. The body of the blade is preferably of uniform thickness and so curved that the cross-sectional form is that of an arc of a circle, as shown in Fig. 3.

To remove a weed from the ground with my improved weeder, it is only necessary to push the blade vertically into the ground, so that the main root of the weed will occupy the center of the circle of which the blade is an arc, then give the implement a half-turn by means of the handle, which preferably extends transversely of the shank, as shown, and the weed with its roots and a portion of the root-inclosing soil can be withdrawn from the ground with the blade.

In Fig. 3 I have indicated by dotted lines the relative position of the weed.

C represents the main stem of the root, and C' the lateral branches or fibers. The position of the fibers (represented by the dotted lines) is that which they would assume after the blade had been inserted in the ground and given a quarter-turn in the direction taken by the hands of a watch. By making the longitudinal edges $A^3$ blunt they will not cut so many of the root-fibers as they would if made sharp or of very thin metal, as in ordinary trowels, but will draw them out of the surrounding soil, as indicated by the dotted lines. The beveled edges A' on the lower end are blunted for the same reason. When desired, one edge may be made sharp, as shown at $A^4$ in Fig. 4, and the other edge $A^5$ may be enlarged and rounded to increase the effect of blunting the edge when the implement is used to remove weeds having tender fibers. By having one edge of the blade sharp and turning the implement in the proper direction to advance the sharp edge large roots which could not be pulled out with the blunt edge can be more easily cut and broken off. When desired, the beveled edges can be made to extend from the middle line of the blade toward the handle, as indicated by the dotted lines $A^6$.

I am aware that a shovel provided with a curved blade and having a sharpened edge has been described, and such matter is not of my invention. In said shovel the blade had an angular arrangement with respect to the handle, which would prevent the object of my improvement, since it would not be practicable to turn such a device in the soil, owing to such angle. Further, it may be noted that the curvature of the blade was so small and the width so large as to render it operative for the purposes of my improvement apart from the angular arrangement of the blade and handle before mentioned.

What I claim as new, and desire to secure by Letters Patent, is—

1. As an improved article of manufacture, a weeding implement comprising a handle, a tapering concavo-convex blade having the cross-sectional form of an arc of a circle and approximately equal to a semicircle, with one of the tapered edges blunted, said blade and handle being arranged in practically the same line, substantially as described.

2. A weeding implement comprising a handle and a concavo-convex blade arranged in practically the same line, said blade being approximately equal to a semicircle in cross-section and having one of the longitudinal edges sharp and the other edge blunted, substantially as described.

In testimony whereof I have hereunto set my hand this 4th day of October, 1890.

ROBERT F. SILLIMAN.

Witnesses:
  GEO. A. MOSHER,
  CHAS. L. ALDEN.